No. 664,397. Patented Dec. 25, 1900.
F. W. FRENCH.
CULTIVATOR SHOVEL.
(Application filed Apr. 24, 1900.)
(No Model.)
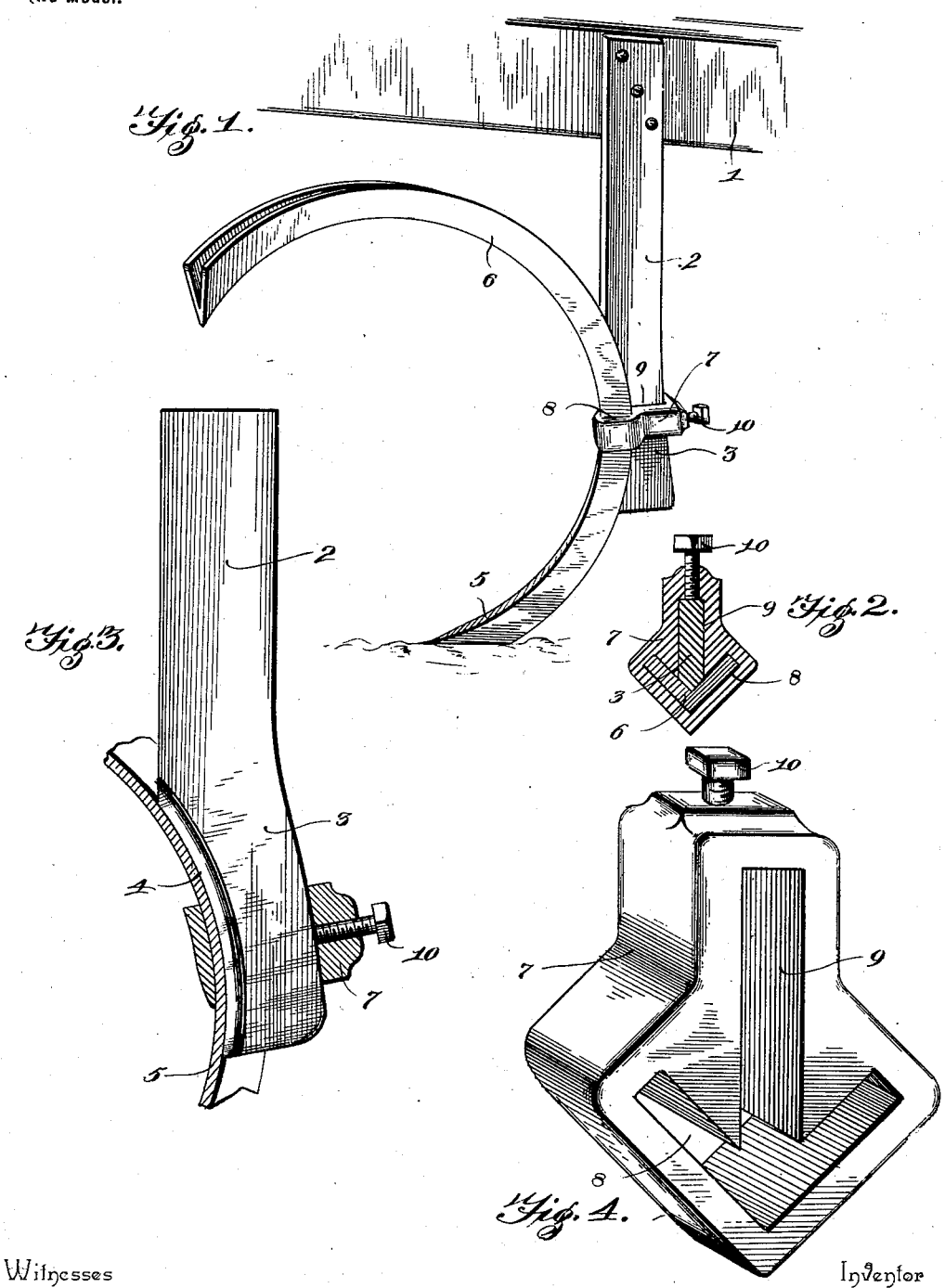
Witnesses
By his Attorneys.
Inventor
F. W. French.
C. A. Snow & Co.

UNITED STATES PATENT OFFICE.

FREDERICK WM. FRENCH, OF BOSTONIA, CALIFORNIA.

CULTIVATOR-SHOVEL.

SPECIFICATION forming part of Letters Patent No. 664,397, dated December 25, 1900.

Application filed April 24, 1900. Serial No. 14,140. (No model.)

*To all whom it may concern:*

Be it known that I, FREDERICK WM. FRENCH, a citizen of the United States, residing at Bostonia, in the county of San Diego and State of California, have invented a new and useful Cultivator-Shovel, of which the following is a specification.

This invention relates to cultivators, and has for its object to provide an improved cultivator-shovel having means for adjustably connecting the same to a standard, so that the shovel may be raised or lowered to take up wear and to accommodate the cultivator to the work required thereof. It is furthermore designed to provide means for rigidly connecting the shovel to a standard, so as to effectively prevent accidental turning thereof, and to arrange the device for application to any ordinary cultivator-beam.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a cultivator-shovel constructed and arranged in accordance with the present invention. Fig. 2 is a horizontal transverse sectional view taken through the means for securing the shovel to the standard. Fig. 3 is an enlarged detail longitudinal sectional view thereof. Fig. 4 is an enlarged detail perspective view of the clamp for connecting the shovel to the standard.

Corresponding parts in the several figures of the drawings are designated by like characters of reference.

Referring to the accompanying drawings, 1 designates an ordinary cultivator-beam, from which depends a standard 2, which has its lower end inclined rearwardly, as at 3, and the front edge 4 of this inclined portion is dished longitudinally or curved inwardly. Secured to the standard in a manner which will be hereinafter explained is the cultivator-shovel 5, formed by a substantially semicircular metallic angle-bar that is substantially V-shaped in cross-section. The lower end of this bar is cut so as to form a comparatively broad point to constitute the shovel, and the remaining upper portion 6, which bows upwardly beneath the beam, forms the shank of the shovel and is connected to the standard 2.

The means for connecting the shank of the shovel to the standard comprise a clamp 7, which is provided at its forward end with a substantially V-shaped slot 8, that is vertically disposed and designed to slidably receive the shank of the shovel. Extending rearwardly from the vertex of the angular slot is a straight longitudinal slot 9, which is designed to loosely receive the inclined portion of the standard, and passing through the rear end of the clamp is a set-screw 10, which enters the longitudinal slot 9, so as to bear against the rear edge of the standard, and thereby clamp the shovel to the standard. It will now be understood that the front edge of the inclined portion of the standard is dished to accommodate itself to the bowed shank of the shovel, and, as best shown in Fig. 2 of the drawings, this dished edge is also beveled at opposite sides to form a knife-edge to fit snugly between the angular sides of the shank. Also the lower end of the standard is inclined rearwardly, so that the shovel may assume a proper position with respect to the ground, and as the shovel becomes worn the shank may be adjusted downwardly through the clamp to take up the wear, and the latter may be adjusted vertically upon the standard to raise or lower the shovel.

By reason of the continuous formation of the shovel and the shank in the arc of a circle the loosened earth will not pack upon the shovel, and the inclined sides of the shovel and shank form a central cutting edge for cutting roots, weeds, and other obstructions, thereby decreasing the draft upon the cultivator. Also by reason of the circular adjustment of the shank the shovel will always assume the proper position when adjusted in either direction through the clamp.

What is claimed is—

1. The combination with a standard, and the shank of a cultivator-shovel, of a clamp having intersecting slots for the reception of the shank and the standard, respectively, and means for binding the clamp upon the shank and standard.

2. The combination with a standard, and an angular shovel-shank, of a clamp, having an angular slot for the reception of the shank, and another slot intersecting the vertex of the former slot and for the reception of the standard, the latter fitting snugly between the angular sides of the shank, and means for binding the clamp upon the shank and the standard.

3. The combination with a standard, and a substantially V-shaped shovel-shank, of a clamp having a substantially V-shaped slot for the reception of the shank, a longitudinal slot intersecting the vertex of the former slot, extending rearwardly between the opposite branches thereof, and for the reception of the standard, the latter fitting snugly between the opposite angular sides of the shank, and a set-screw entering the outer end of the longitudinal slot and bearing against the standard.

4. The combination with a standard, having a rearwardly-inclined lower end portion, the front edge thereof being dished, of a shovel, having an arcuate shank, and a clamp embracing the shank and the inclined portion of the standard, the shank also having a longitudinal and slidably-adjustable connection with the clamp.

5. A cultivator-shovel, comprising an arcuate angle-bar, which is substantially V-shaped in cross-section, and has its lower end cut transversely to form a broad point.

In testimony that I claim the foregoing as my own I have hereto affixed my signature in the presence of two witnesses.

FREDERICK WM. FRENCH.

Witnesses:
D. G. GORDON,
JAMES H. GORDON.